(12) United States Patent
Ohara et al.

(10) Patent No.: US 11,129,203 B2
(45) Date of Patent: Sep. 21, 2021

(54) USER APPARATUS, AND RANDOM ACCESS PREAMBLE TRANSMISSION METHOD

(71) Applicant: NTT DOCOMO, INC., Tokyo (JP)

(72) Inventors: Tomoya Ohara, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 70 days.

(21) Appl. No.: 16/495,173

(22) PCT Filed: Mar. 23, 2017

(86) PCT No.: PCT/JP2017/011878
§ 371 (c)(1),
(2) Date: Sep. 18, 2019

(87) PCT Pub. No.: WO2018/173230
PCT Pub. Date: Sep. 27, 2018

(65) Prior Publication Data
US 2021/0120588 A1    Apr. 22, 2021

(51) Int. Cl.
*H04W 74/08* (2009.01)
*H04W 72/04* (2009.01)
*H04W 74/00* (2009.01)

(52) U.S. Cl.
CPC ..... *H04W 74/0833* (2013.01); *H04W 72/042* (2013.01); *H04W 72/046* (2013.01); *H04W 74/008* (2013.01); *H04W 74/0891* (2013.01)

(58) Field of Classification Search
CPC ........... H04W 74/0833; H04W 74/008; H04W 74/0891; H04W 72/042
USPC ....................................................... 370/329
See application file for complete search history.

(56) References Cited

U.S. PATENT DOCUMENTS

| 2013/0244679 A1* | 9/2013 | Anbe | H04W 76/10 |
| | | | 455/452.1 |
| 2018/0176948 A1* | 6/2018 | Islam | H04W 52/242 |
| 2018/0176949 A1* | 6/2018 | Islam | H04B 7/0695 |

FOREIGN PATENT DOCUMENTS

WO    2012063350 A1    5/2012

OTHER PUBLICATIONS

3GPP TS 36.321 V14.1.0; "3rd Generation Partnership Project; Technical Specification Group Radio Access Network; Evolved Universal Terrestrial Radio Access (E-UTRA); Medium Access Control (MAC) protocol specification (Release 14)" Dec. 2016 (98 pages).
3GPP TS 36.211 V14.1.0; "3rd Generation Partnership Project; Technical Specification Group Radio Access Network; Evolved Universal Terrestrial Radio Access (E-UTRA); Physical channels and modulation (Release 14)" Dec. 2016 (189 pages).

(Continued)

*Primary Examiner* — Peter G Solinsky
(74) *Attorney, Agent, or Firm* — Osha Bergman Watanabe & Burton LLP

(57) ABSTRACT

A user apparatus in a radio communication system that includes a base station and the user apparatus includes a reception unit that receives, from the base station, information that designates a signal waveform to be used by the user apparatus to transmit a random access preamble; and a transmission unit that transmits the random access preamble with the use of the signal waveform designated by the information received by the reception unit.

8 Claims, 12 Drawing Sheets

(56) References Cited

OTHER PUBLICATIONS

CATT; "Further details on NR 4-step RA Procedure"; 3GPP TSG RAN WG1 Meeting #88, R1-1702066; Athens, Greece, Feb. 13-17, 2017 (6 pages).
International Search Report issued in International Application No. PCT/JP2017/011878, dated Jun. 13, 2017 (5 pages).
Written Opinion issued in International Application No. PCT/JP2017/011878; dated Jun. 13, 2017 (4 pages).

* cited by examiner

| PREAMBLE FORMAT | WAVEFORM |
|---|---|
| 0 | .... |
| 1 | .... |
| 2 | .... |
| 3 | .... |
| 4 | .... |

USER APPARATUS, AND RANDOM ACCESS PREAMBLE TRANSMISSION METHOD

TECHNICAL FIELD

The present invention relates to a user apparatus in a radio communication system.

BACKGROUND ART

According to LTE (Long Term Evolution), random access (RA) is performed by a user apparatus to establish connection with a base station, to perform resynchronization, or the like (a Non-patent Reference No. 1).

Concerning 3GPP (3rd Generation Partnership Project), study for a radio communication scheme called 5G or NR (New Radio) is in progress for increasing a system capacity, increasing a data transmission speed, reducing a delay in a radio section, and so forth. Hereinafter, the term "NR" will be used. Concerning NR, various radio technologies have been studied in order to fulfill requirements of achieving a throughput greater than or equal to 10 Gbps and reducing a delay in a radio section to less than or equal to 1 ms at the same time.

In NR, it is expected to use a wide band from a low frequency band similar to LTE up to a frequency band higher than in LTE. In particular, because a propagation loss increases in a high frequency band, a study has been made for using a beamforming technology of forming a beam having a narrow beam width for compensating the increase in the propagation loss.

Also, concerning NR, a study has been made for using CP-OFDM and DFT-S-OFDM (DFT-Spreading-OFDM) as an uplink signal waveform.

PRIOR ART REFERENCE

Non-Patent Reference

Non-patent Reference No. 1: 3GPP TS 36.321 V14.1.0 (2016-12)
Non-patent Reference No. 2: 3GPP TS 36.211 V14.1.0 (2016-12)

SUMMARY OF THE INVENTION

Problem to be Solved by the Invention

Also in NR, it is expected to perform a random access procedure similar to a random access procedure in LTE, and use CP-OFDM or DFT-S-OFDM as a signal waveform in a random access procedure.

In a case where DFT-S-OFDM is used for transmitting a RA (ransom access) preamble that is a first message in a random access procedure, it is necessary to use resources that are continuous along a frequency axis because DFT-S-OFDM uses a single carrier. Therefore, it may be impossible to use resources flexibly. As a result, such a problem that a user capacity is insufficient may arise. In contrast, in a case where CP-OFDM is used for transmitting a RA preamble, it is possible to increase a user capacity by performing frequency multiplexing, separation in sub-carrier units, and/or the like; to perform terminal transmission beam sweeping, to acquire a frequency diversity effect, and so forth. However, coverage may be smaller than expected.

Thus, the respective signal waveforms have corresponding characteristics. If a user apparatus freely selects a signal waveform in a random access procedure, it may be impossible to utilize superior characteristics of the signal waveforms, and overall system performance may be degraded.

The present invention has been devised in consideration of the above-mentioned point, and an object is to provide a technology enabling a user apparatus to perform a random access procedure with the use of a suitable signal waveform in a radio communication system that includes the user apparatus and a base station.

Means to Solve the Problem

According to a disclosed technology, a user apparatus is provided in a radio communication system that includes a base station and the user apparatus. The user apparatus includes:

a reception unit that receives, from the base station, information that designates a signal waveform to be used by the user apparatus for transmitting a random access preamble; and a transmission unit that transmits the random access preamble with the use of the signal waveform designated by the information received by the reception unit.

Advantageous Effects of the Invention

According to the disclosed technology, a technology is provided enabling a user apparatus to perform a random access procedure with the use of a suitable signal waveform in a radio communication system that includes the user apparatus and a base station.

MODE FOR CARRYING OUT THE INVENTION

Below, a mode for carrying out the present invention will be described with reference to drawings. Note that the mode for carrying out the present invention (a present carrying-out mode) that will now be described is merely one example, and a mode for carrying out the present invention is not limited to the carrying-out mode that will now be described.

When a radio communication system according to the present carrying-out mode operates, the radio communication system can appropriately use existing technologies. In this regard, the existing technologies include, for example, existing LTE. However, the existing technologies are not limited to the existing LTE. Further, "LTE" used herein has, unless otherwise noted, a wide meaning covering LTE-Advanced and schemes (for example, NR) developed after LTE-Advanced.

Furthermore, in the description of the carrying-out mode that will now be made, terms such as random access, RA preamble, RAR, RAR window, SIB, PUSCH, and so forth used in the existing LTE will be used. However, the reason therefor is a convenience for description. Therefore, signals, functions, and so forth same as or similar to the above-mentioned random access, RA preamble, RAR, RAR window, SIB, PUSCH, and so forth may be called other names.

Furthermore, in the description of the present carrying-out mode, a random access procedure based on a random access procedure prescribed for LTE is used as an example. However, the applications for which the present invention is used are not limited to the random access procedure based on a random access procedure prescribed for LTE.

Furthermore, in the description of the mode for carrying out the present invention, CP-OFDM and DFT-S-OFDM are cited as examples of a signal waveform. However, CP-OFDM and DFT-S-OFDM are merely examples. The present invention can be used also for a signal waveform other than CP-OFDM and DFT-S-OFDM.

Below, first, an entire configuration of a system and an example of basic operations of a random access procedure will be described as a basic example. Then, first through fourth embodiments that are embodiments of the present invention will be described. The first through fourth embodiments are based on the basic example, for example. However, alternatively, the first through fourth embodiments may be based on a random access scheme for performing operations different from those of the basic example that will now be described.

Basic Example

<Overall System Configuration>

Figure 1:
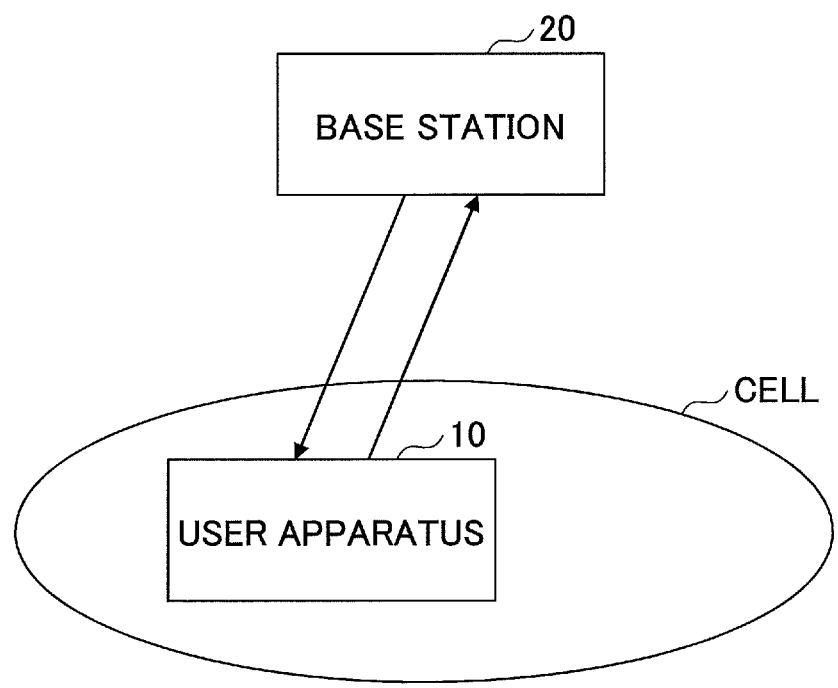
FIG. 1 is a configuration diagram of a radio communication system according a mode for carrying out the present invention.

FIG. 1 illustrates a radio communication system according to the present carrying-out mode. The radio communication system according to the present carrying-out mode includes, as illustrated in FIG. 1, a user apparatus 10 and a base station 20. In FIG. 1, the single user apparatus 10 and the single base station 20 are illustrated. However, this is an example, and there may be a plurality of the user apparatuses 10 and a plurality of the base stations 20.

The user apparatus 10 is a communication apparatus having a radio communication function such as a smartphone, a cellular phone, a tablet, a wearable terminal, or a communication module for M2M (Machine-to-Machine). The user apparatus 10 is connected with the base station 20 in a wireless manner and uses various communication services provided by the radio communication system. The base station 20 provides one or more cells, and is a communication apparatus that performs radio communication with the user apparatus 10. Each of the user apparatus 10 and the base station 20 can perform beamforming for transmitting or receiving a signal.

In the present carrying-out mode, a duplex scheme to be used may be a TDD (Time Division Duplex) scheme or a FDD (Frequency Division Duplex) scheme.

In addition, hereinafter, transmission of a signal with the use of a transmission beam has the same meaning as transmission of a signal multiplied with a precoded vector (or precoded with a precoding vector). In the same way, reception with the use of a reception beam has the same meaning as multiplying a received signal with a predetermined weight vector. In addition, transmission of a signal with the use of a transmission beam may be expressed also as transmission of a signal with the use of a specific antenna port. In the same way, reception of a signal with the use of a reception beam may be expressed also as reception of a signal with the use of a specific antenna port. The antenna port means a logical antenna port defined in a 3GPP standard. Note that methods of forming a transmission beam and a reception beam are not limited to the above-mentioned methods. For example, also a method of changing angles of respective antennas of the user apparatus 10 or the base station 20 may be used. Also a method of combining the method of using a precoding vector with the method of changing angles of antennas may be used. Also another method may be used.

Hereinafter, a beam used for transmitting a signal from the base station 20 will be referred to as a BS transmission beam; a beam used for receiving a signal by the base station 20 will be referred to as a BS reception beam; a beam used for transmitting a signal from the user apparatus 10 will be referred to as a UE transmission beam; and a beam used for receiving a signal by the user apparatus 10 will be referred to as a UE reception beam.

<Random Access Procedure>

Figure 2:
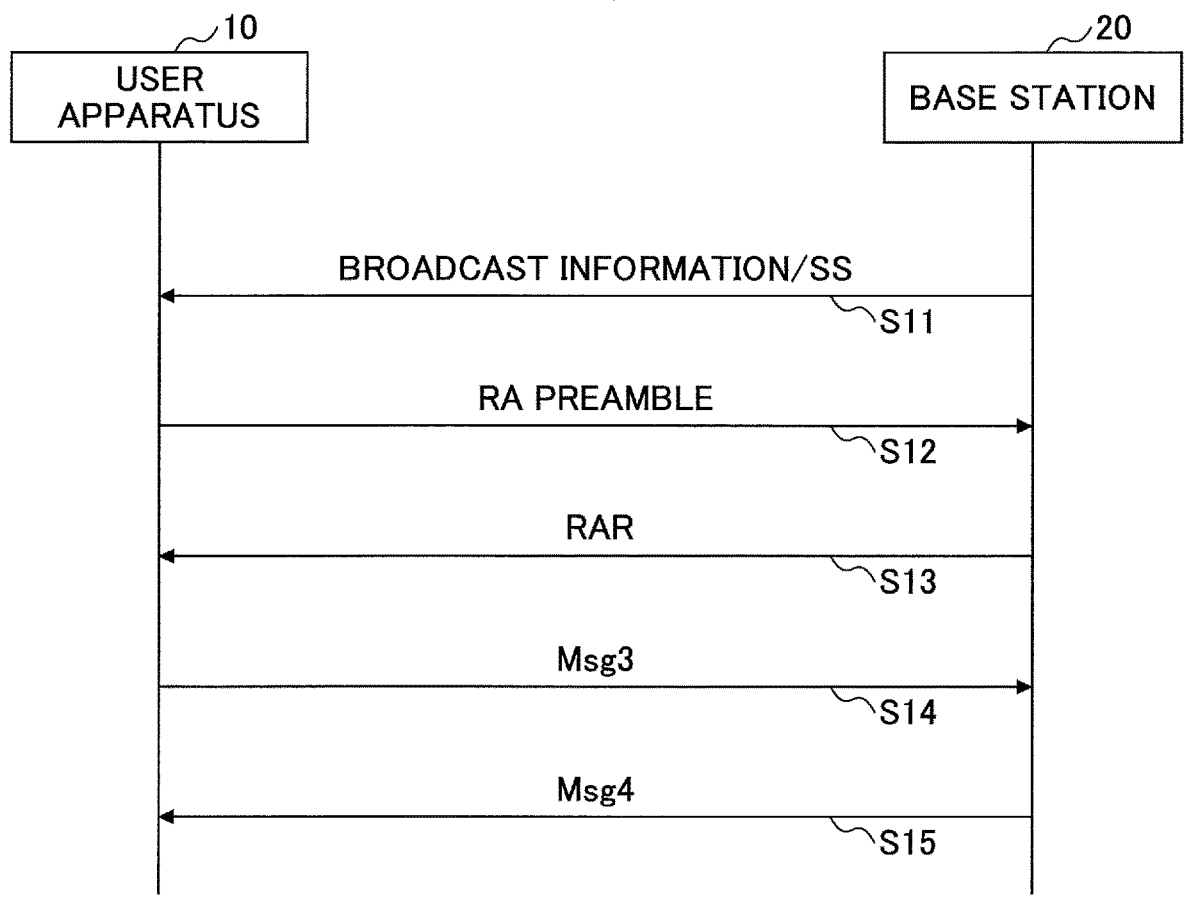
FIG. 2 illustrates an example of a random access procedure.

With reference to FIG. 2, an example of a random access procedure (an example of contention based) according to the present carrying-out mode will be described. The present carrying-out mode performs a random access procedure (the Non-patent Reference No. 1) similar to a random access procedure used in LTE, for example. It is noted that, when signals are transmitted and received in a random access procedure, each of the user apparatus 10 and the base station 20 uses a transmission beam and a reception beam. Further, some signal transmission or reception operations may be omni-transmission or omni-reception operations. Furthermore, operations of the first through fourth embodiments that will be described later may be applied also to a case where all the signal transmission and reception operations are omni-transmission and omni-reception operations.

The base station 20 performs beam sweeping to transmit broadcast information and a synchronization signal (hereinafter, referred to as SS) in each BS transmission beam at respective predetermined periods (step S11). The transmission periods of the broadcast information and the synchronization signal may be the same as each other or may be different from each other. Further, also a SIB (System Information Block) described later is transmitted with each BS transmission beam at a predetermined period. The SIB may also be called "system information".

Figure 3:
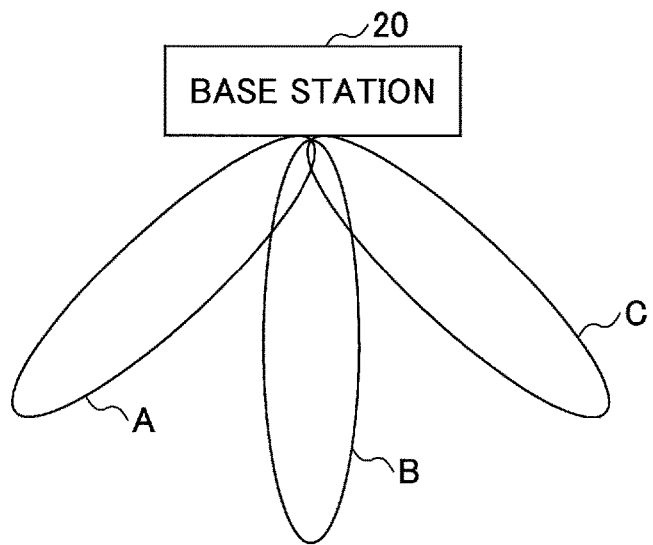
FIG. 3 illustrates beams to be transmitted from a base station 20.

FIG. 3 illustrates an image of the BS transmission beams. In the example of FIG. 3, three A, B, and C BS transmission beams are illustrated. With each of the three BS transmission beams, broadcast information, SS, SIB, and so forth are transmitted. During beam sweeping, a BS transmission beam is switched at each time period (for example, for each symbol), for example.

The broadcast information is basic system information (corresponding to a MIB in LTE) transmitted via a PBCH, for example. There are two types of signals (code sequences) as SS, i.e., a P-SS and a S-SS, for example. The P-SS is a signal for the purpose of symbol timing synchronization or the like, for example. The S-SS is a signal for the purpose of radio frame synchronization or the like, for example.

The user apparatus 10 can identify a BS transmission beam by receiving broadcast information or SS or by receiving "broadcast information and SS" with the BS transmission beam. Identifying a BS transmission beam means, for example, detecting an identifier (ID) of the BS transmission beam. The ID of a BS transmission beam may be an antenna port number. For example, the ID of a BS transmission beam may be included in broadcast information or may be included in a SS. Further, the ID of a BS transmission beam may be associated with resources (time and/or frequency resources) with which broadcast information or a SS is transmitted, and the user apparatus 10 may identify the BS transmission beam with the use of the resources with which the broadcast information or the SS is received.

A block that includes any one of P-SS, S-SS, and broadcast information may be called a SS-block. The user apparatus 10 being able to receive a SS-block transmitted from the base station 20 (i.e., able to identify the contents of the SS-block) may be regarded as the user apparatus 10 being able to identify the BS transmission beam associated with the SS-block. In this case, the user apparatus 10 identifies the ID of the BS transmission beam with the use of the contents of the received SS-block or with the use of the resources with which the SS-block is received, for example.

In a case where resources for a SS-block are associated with a BS transmission beam, the "ID of the BS transmission beam" that the user apparatus 10 identifies should not necessarily be an ID (referred to as a "beam ID") allocated for the BS transmission beam. For example, a time position of the SS-block (for example, a symbol index) is associated with a BS transmission beam, and also, is associated with a RACH resource subset that is of resources for transmitting a RA preamble. In this case, the time position (for example, the symbol index) can be considered as the "ID of the BS transmission beam". In this case, what the user apparatus 10 is to perform is only to recognize the time position (for example, the symbol index) of the SS-block. Further, in this case, for example, the beam ID may be included in the broadcast information.

Resources for a SS-block being associated with a BS transmission beam means, for example, that, in a case where there are a BS transmission beam A and a BS transmission beam B, the same BS transmission beam A is used for a symbol A each time at a cycle of a certain time unit, and the same BS transmission beam B is used for a symbol B each time at a cycle of a certain time unit.

In a case where resources for a SS-block are not associated with a BS transmission beam, the base station 20 transmits broadcast information that includes a beam ID to the user apparatus 10, and the user apparatus 10 identifies the BS transmission beam by reading the beam ID transmitted in the broadcast information, for example.

A technology according to the present carrying-out mode can use either one of the above-mentioned two patterns. In step S12 of FIG. 2, the user apparatus 10 transmits a RA preamble (Message1) with the use of resources (referred to as a RACH resource subset) corresponding to a BS transmission beam of broadcast information and/or SS (referred to as "broadcast information/SS") that has been able to be received in step S11.

In response to detecting the RA preamble, the base station 20 transmits a RA response (RAR, Message2) that is a response thereto to the user apparatus 10 (step S13). In response to receiving the RA response, the user apparatus 10 transmits Message3 that includes predetermined information to the base station 20 (step S14). Message3 is, for example, a RRC connection request.

In response to receiving Message3, the base station 20 transmits Message4 (for example, a RRC connection setup) to the user apparatus 10. In response to determining that the predetermined information is included in Message4, the user apparatus 10 determines that Message4 is Message4 addressed to the user apparatus 10 in response to Message3, and ends the random access procedure. In contrast, in a case where the user apparatus 10 cannot determine that the predetermined information is included in Message4, the user apparatus 10 determines that the random access is unsuccessful, and again performs the procedure from transmission of a RA preamble.

<RA Preamble Transmission Method>

An example of a RA preamble transmission method in the above-mentioned step S12 will now be described in further detail.

According to the present carrying-out mode, the user apparatus 10 selects a set of broadcast information/SS that has been able to be received from among a plural sets of broadcast information/SS transmitted from the base station 20 through beam sweeping. This is the same as selecting the BS transmission beam with which the set of broadcast information/SS that has been able to be received is transmitted. The above-mentioned "has been able to be received" means that the broadcast information/SS has been able to be received with satisfactory reception quality, for example. However, what is meant by the above-mentioned "has been able to be received" is not limited thereto.

According to the present carrying-out mode, a BS transmission beam from the base station 20 is associated with a RACH resource subset that is of resources to be used by the user apparatus 10 to transmit a RA preamble. The user apparatus 10 transmits a RA preamble with the use of the RACH resource subset corresponding to the selected BS transmission beam.

Figure 4:
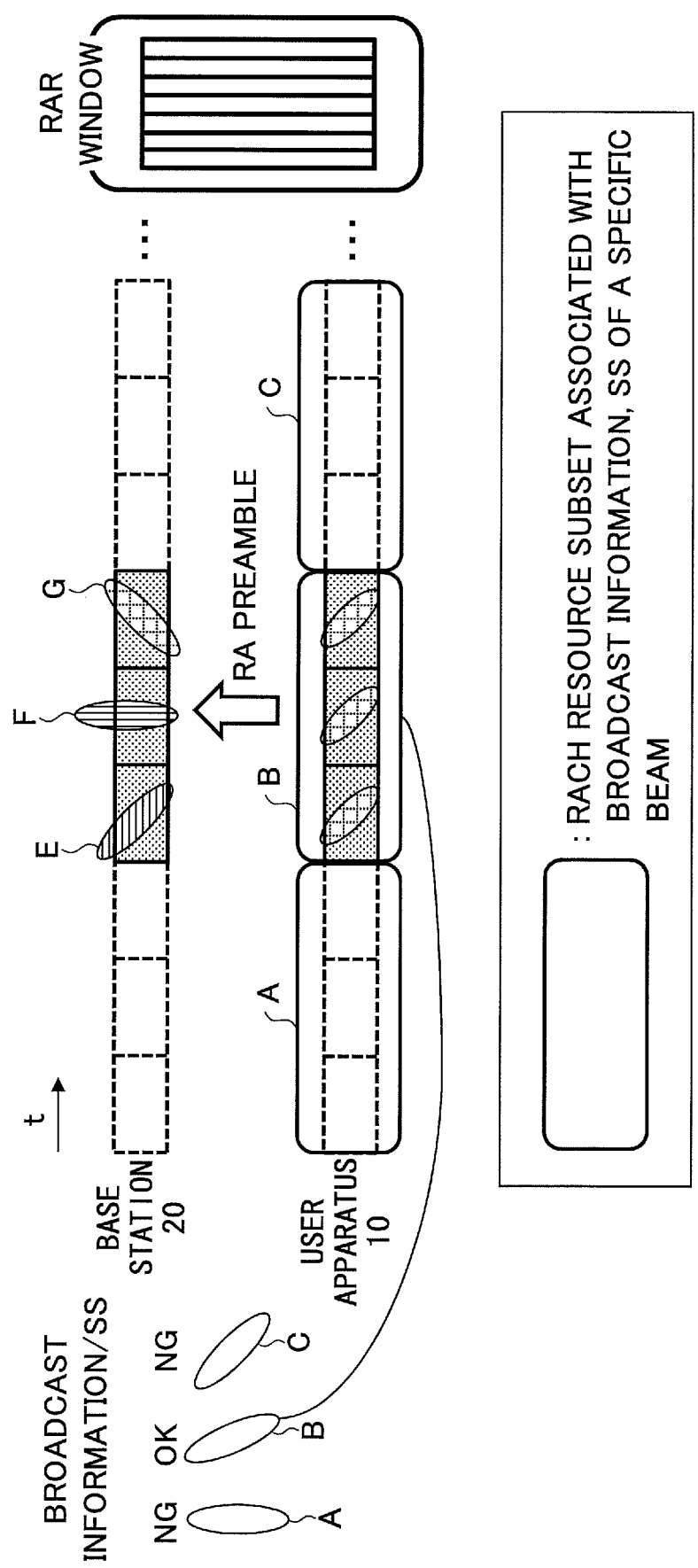
FIG. 4 illustrates a RA preamble transmission method.

For example, FIG. 4 illustrates RACH resource subsets A, B, and C at the user apparatus 10. The RACH resource subsets A, B, and C correspond to, for example, BS transmission beams A, B, and C such as those illustrated in FIG. 3. Note that according to FIG. 4, the plurality of RACH resource subsets are divisions along a time direction to be associated with the respective BS transmission beams. However, this is merely one example. A plurality of RACH resource subsets may be divisions along a frequency direction to correspond to respective BS transmission beams. Further alternatively, a plurality of RACH resource subsets may be divisions in time and frequency units to be associated with respective BS transmission beams.

The example of FIG. 4 is a case where the user apparatus 10 has been able to receive broadcast information/SS transmitted with a BS transmission beam B, and the user apparatus 10 transmits a RA preamble with the RACH resource subset B corresponding to the BS transmission beam B. Note that, in a frame of the RACH resource subset B of FIG. 4, images of UE transmission beams are illustrated.

The base station 20 can determine broadcast information/ SS (a BS transmission beam) received by the user apparatus 10 on the basis of resources for a RA preamble received from the user apparatus 10. In the example of FIG. 4, the base station 20 receives a RA preamble through a RACH resource subset B. Therefore, the base station 20 can determine that the BS transmission beam B corresponding to the RACH resource subset B is a suitable BS transmission beam that can be received by the user apparatus 10. For example, the base station 20 can use the BS transmission beam B for transmitting a signal to the user apparatus 10 thereafter. Note that, in FIG. 4, beams E, F, and G at the base station 20 represent BS reception beams. In this example, as illustrated, the base station 20 performs beam sweeping at the reception side.

Further, FIG. 4 illustrates a RAR window. According to the present carrying-out mode, in the same manner as an existing LTE, the user apparatus 10 which has transmitted a RA preamble performs monitoring to detect a RA response within a predetermined time period defined by the RAR window, and determines that the random access is unsuccessful in a case of not receiving the RA response. However, this is one example, and another process than the existing LTE may be performed as the random access successful/ unsuccessful determining process.

FIG. 4 illustrates an example where the user apparatus 10 has been able to receive broadcast information/SS with a single BS transmission beam. FIG. 4 also illustrates an example where the user apparatus 10 has been able to receive broadcast information/SS with a plurality of BS transmission beams, and selects one BS transmission beam with which the broadcast information/SS has been able to be received most satisfactorily (for example, the broadcast information/SS received with the BS transmission beam has the best reception quality) from among the plurality of BS transmission beams.

Figure 5:
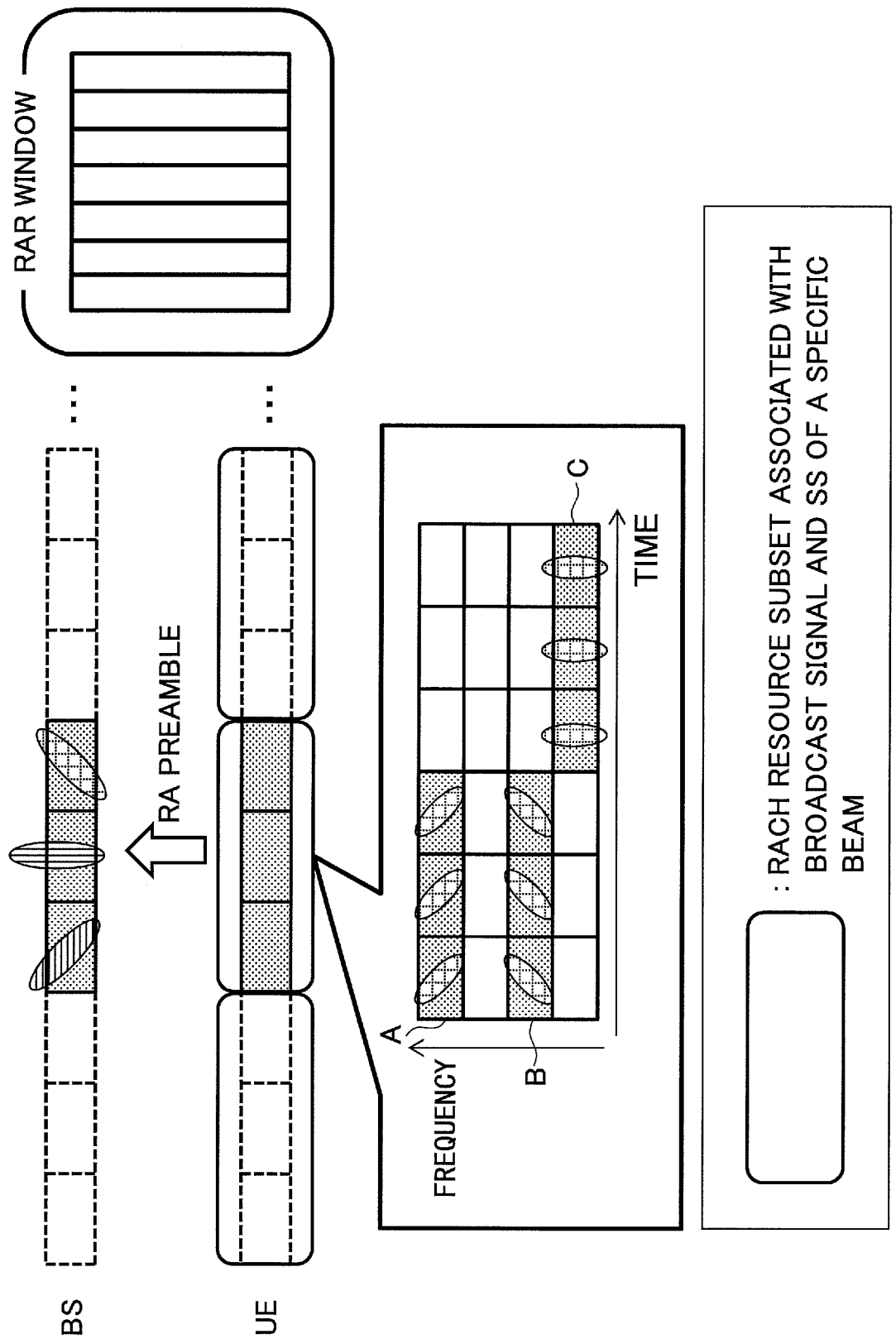
FIG. 5 illustrates a RA preamble transmission method.

Further, as illustrated in FIG. 5, the user apparatus 10 may transmit a RA preamble after multiplexing the RA preamble along a frequency direction and/or a time direction within a RACH resource subset. FIG. 5 illustrates a state where a plurality of units A, B, and C of RA preamble transmission with different UE transmission beams are multiplexed.

Figure 6:
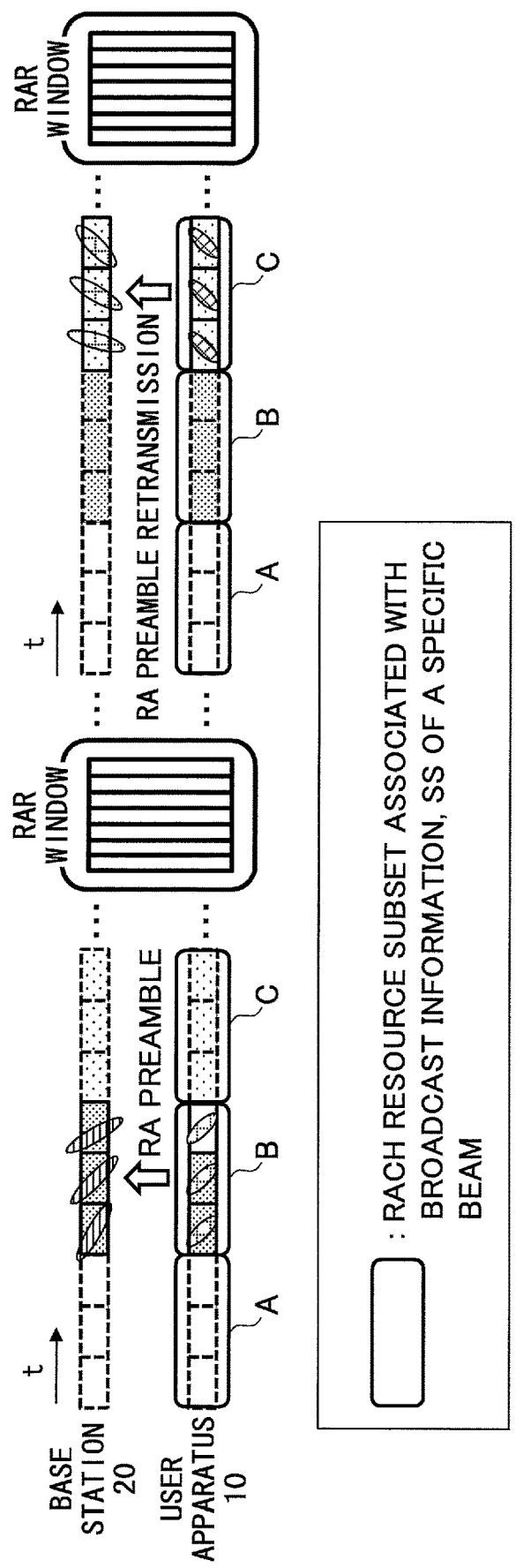
FIG. 6 illustrates an example of retransmission.

Further, FIG. 6 illustrates one example where retransmission is performed. FIG. 6 illustrates a case where at a time of retransmission, the user apparatus 10 transmits a RA preamble with the use of a RACH resource subset different from a RACH resource subset used at a time of first transmission (or at a time of previous retransmission). The user apparatus 10 may perform retransmission with the use of the same RACH resource subset as that used at a time of first transmission (or at a time of previous retransmission).

Further, at a time of retransmission, the user apparatus 10 may use transmission power greater than that used at a time of first transmission (or at a time of previous retransmission). This behavior is called power ramping.

<RACH Resource Subset Notification Method>

According to the present carrying-out mode, the base station 20 transmits information that indicates a RACH resource subset corresponding to a BS transmission beam to the user apparatus 10. The user apparatus 10 can identify the RACH resource subset corresponding to the BS transmission beam for the received broadcast information/SS on the basis of the received information. For example, in a case where the user apparatus 10 selects a BS transmission beam A to transmit a RA preamble in a case where the user apparatus 10 receives information that indicates a RACH resource subset A as a RACH resource subset corresponding to the BS transmission beam A from the base station 20, the user apparatus 10 transmits the RA preamble with the use of the RACH resource subset A.

"Information that indicates a RACH resource subset" sent from the base station 20 to the user apparatus 10 may be information (for example, resource indexes) that indicates time and frequency resources of the RACH resource subset, may be information that indicates time resources (time positions) of the RACH resource subset, or may be other information.

For example, the above-mentioned information is sent for each BS transmission beam with the use of a SIB that is transmitted with the BS transmission beam. Further, a SIB that is transmitted with a BS transmission beam may include information of a RACH resource subset corresponding to another BS transmission beam.

Below, first through fourth embodiments will be described as embodiments as to which signal waveform is to be used by the user apparatus 10 for transmitting a signal. A process that will be described concerning each embodiment can be performed in combination with a process that will be described concerning another embodiment, unless a contradiction arises.

First Embodiment

According to a first embodiment, the base station 20 designates, for the user apparatus 10, a signal waveform (CP-OFDM or DFT-S-OFDM according to the present carrying-out mode) to be used to transmit a RA preamble (Msg.1).

Figure 7:
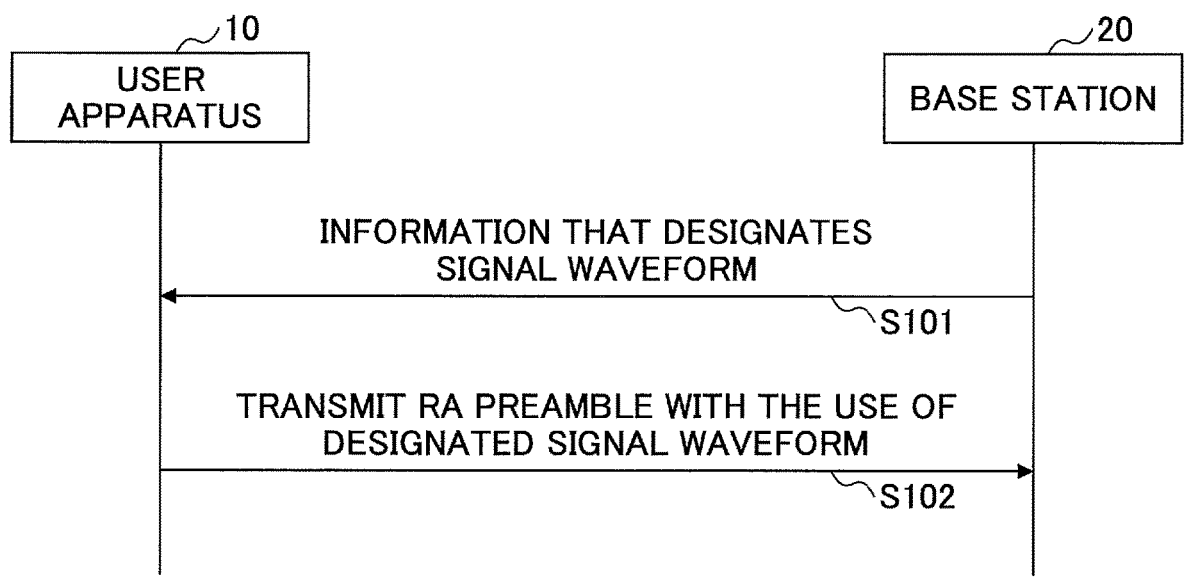
FIG. 7 illustrates a method for designating a signal waveform to be used by a user apparatus 10 according to a first embodiment.

That is, as illustrated in FIG. 7, the base station 20 transmits, to the user apparatus 10, information that designates a signal waveform to be used by the user apparatus 10 to transmit a RA preamble, in step S101. In step S102, the user apparatus 10 transmits a RA preamble with the use of the signal waveform designated in step S101.

The information that designates the signal waveform in step S101 is transmitted with the use of, for example, broadcast broadcast information/SS, DCI, a MAC signal, or RRC signaling. The information that designates the signal waveform may be, for example, one bit of information that indicates CP-OFDM or DFT-S-OFDM, or other information. The base station 20 may select a signal waveform common to the user apparatuses in a cell, or may select a signal waveform individually for a user apparatus. For example, in a case where the number of the user apparatuses in a cell is greater than a predetermined threshold, the base station 20 sends information that indicates CP-OFDM as a signal waveform common to the user apparatuses in the cell, in order that multiplexing can be easily performed.

For example, the user apparatus 10 performs initial RA preamble transmission with the use of the signal waveform designated by the base station 20 in step S101, and also, performs retransmission also with the use of the same signal waveform. However, as will be described concerning a second embodiment, the user apparatus 10 may change a signal waveform depending on the number of times of retransmission.

Note that, at a time of designating a signal waveform for the user apparatus 10 in step S101, the base station 20 may send information that indicates transmission power for a RA preamble of a first transmission for each signal waveform. In this case, the "information that designates a signal waveform" in step S101 of FIG. 7 includes a value that indicates transmission power for a RA preamble of a first transmission for each signal waveform. The value that indicates transmission power may be the exact value of the transmission power itself, may be a difference (an offset) from a predetermined value, may be an index for selecting one from among a plurality of predetermined values, or other information. Further, a timing for sending information that indicates a transmission power for a RA preamble of a first transmission for each signal waveform may be a timing other than a timing for designating the signal waveform for the user apparatus 10.

Figure 8:
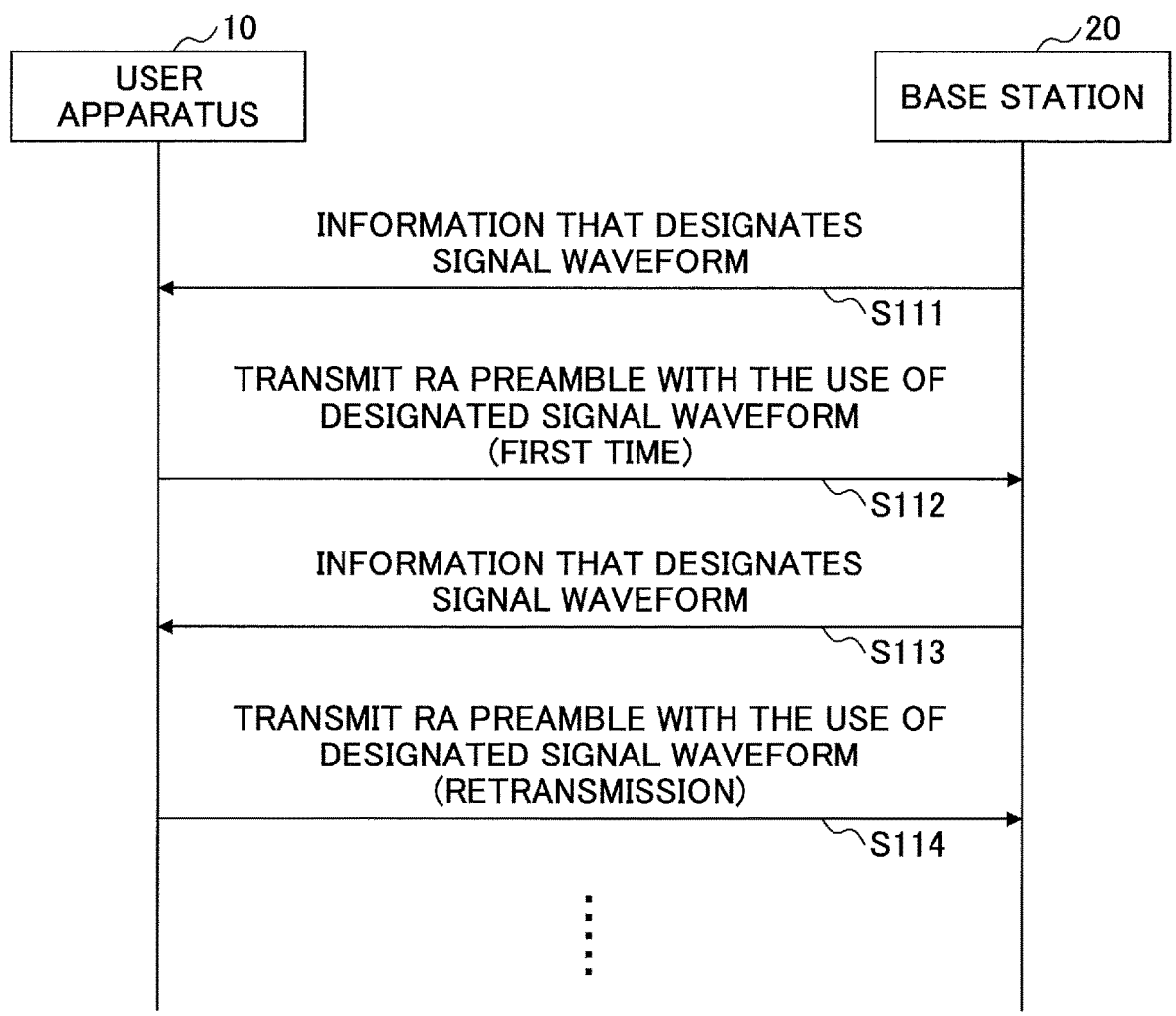
FIG. 8 illustrates one example of a case where, according to the first embodiment, a signal waveform is designated for each RA preamble transmission.

Further, the user apparatus 10 may check a designation of a signal waveform from the base station 20 at each time of RA preamble transmission, and perform RA preamble transmission according to the designation. FIG. 8 illustrates a sequence diagram for this case. As illustrated in FIG. 8, the user apparatus 10 receives information that designates a signal waveform from the base station 20 (step S111), and performs initial RA preamble transmission with the use of the designated signal waveform (step S112). Here, for example, because the user apparatus 10 has not received a RAR within a RAR window time period, the user apparatus 10 determines to perform retransmission of a RA preamble, and receives information that designates a signal waveform from the base station 20 (step S113). Then, the user apparatus 10 uses the designated signal waveform to perform retransmission of a RA preamble (step S114). Thereafter, the same process is repeated until RA preamble transmission becomes successful unless the number of times of retransmission reaches an upper limit.

Figures 9, 10:
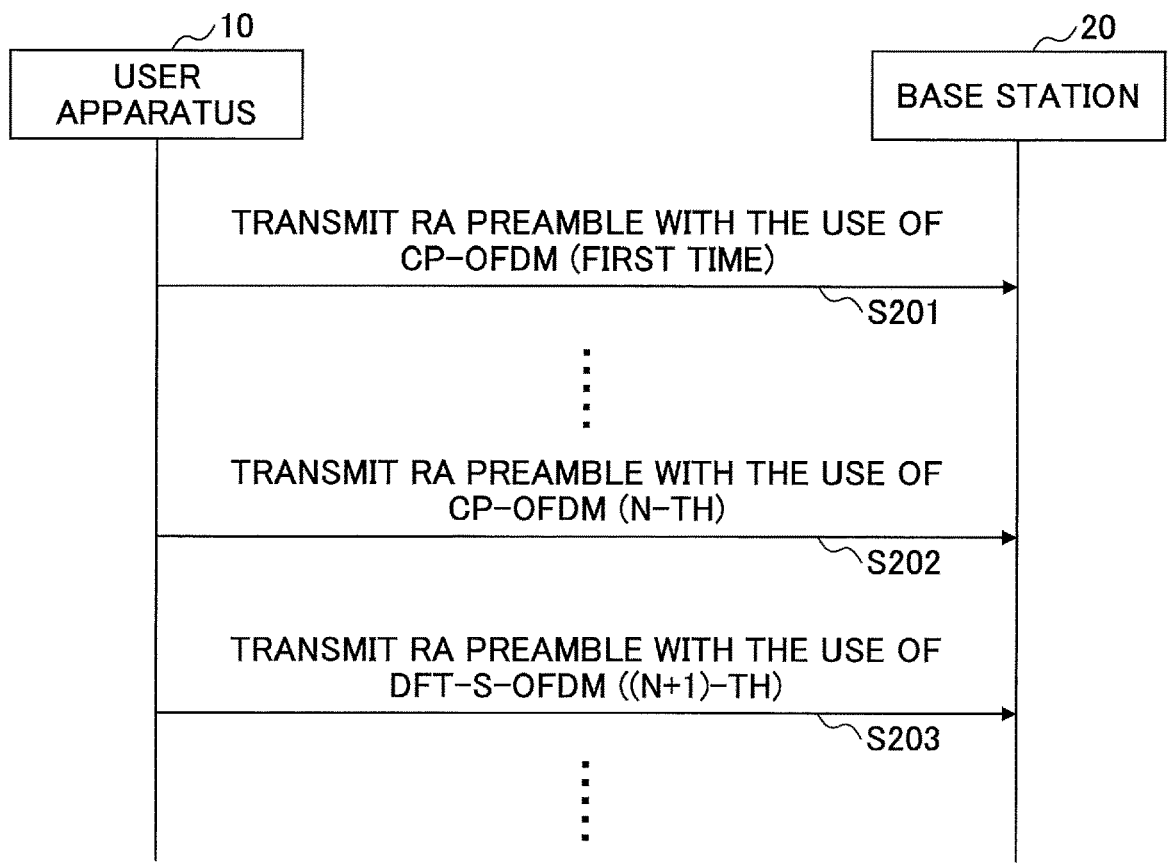
FIG. 9 illustrates an example of associating preamble formats with signal waveforms.
FIG. 10 illustrates an example of operations according to a second embodiment.

Further, a preamble format may be associated with a signal waveform. For example, as illustrated in FIG. 9, numbers that indicate preamble formats are associated with signal waveforms. For example, the corresponding association information is prescribed in a specification, and the user apparatus 10 and the base station 20 previously stores the association information. Further, a plurality of combination patterns may be prescribed in the specification, and information that indicates one of the patterns to be used may be sent by the base station 20 as broadcast information or the like. For example, the association information illustrated in FIG. 9 is assumed as a pattern, plural sets of such association information are prescribed, and the base station 20 sends information that indicates which pattern is to be used in broadcast information or the like. Further, depending on different frequency bands (for example, less than 6 GHz and greater than or equal to 6 GHz), corresponding sets of association information may be defined.

Note that, information concerning a preamble format includes a CP length, a sequence length, and so forth in addition to information of a signal waveform, as disclosed in Non-patent Reference No. 2, for example.

Then, for example, in response to the base station 20 sending information that indicates a preamble format number to be used by the user apparatus 10 in step S101 of FIG. 7, the user apparatus 10 identifies the signal waveform to use on the basis of the correspondence relationship, and transmits a RA preamble with the use of the signal waveform in step S102.

As a result of a signal waveform being designated by the base station 20 for the user apparatus 10 as in the first embodiment, the user apparatus 10 can transmit a RA preamble with the use of a suitable signal waveform.

Note that, in a case where the user apparatus 10 can previously identify a signal waveform suitable for RA preamble transmission, a designation of a signal waveform by the base station 20 described above concerning the first embodiment may be omitted.

Second Embodiment

Next, the second embodiment will be described. According to the second embodiment, the user apparatus 10 transmits a RA preamble from first through N-th time transmission (transmission of second time and thereafter being called retransmission) where N≥1 with the use of a first signal waveform (here, CP-OFDM, for example). The user apparatus 10 performs the transmission subsequent to the N-th time transmission and thereafter with the use of a second signal waveform (here, DFT-S-OFDM, for example).

FIG. 10 illustrates a process sequence according to the second embodiment. In step S201, the user apparatus 10 performs first RA preamble transmission with the use of CP-OFDM. Thereafter, the RA preamble transmission is unsuccessful, retransmission of a RA preamble with the use of CP-OFDM is repeated, and, in step S202, the user apparatus 10 performs N-th RA preamble transmission with the use of CP-OFDM. Thereafter, until the number of times of retransmission reaches an upper limit, the user apparatus 10 performs RA preamble transmission with the use of DFT-S-OFDM, unless the RA preamble transmission becomes successful (step S203 and so forth).

N is a value (for example, a value prescribed in a standard specification) that each of the user apparatus 10 and the base station 20 previously stores, for example. Alternatively, N may be a value that is informed to the user apparatus 10 from the base station 20 with the use of broadcast information/SS, DCI, a MAC signal, or RRC signaling.

As described above, it is expected that the user apparatus 10 performs power ramping at a time of retransmission of a RA preamble. Therefore, as the number of times of transmission of a RA preamble becomes greater, the transmission power for a RA preamble becomes greater accordingly. Therefore, in the example illustrated in FIG. 10, DFT-S-OFDM that requires a low PAPR is used for a case where the number of times of transmission of a RA preamble has increased.

Concerning the above-mentioned power ramping, the user apparatus 10 may store information of the number of times of power ramping for each signal waveform. For example, the following assumes that the user apparatus 10 performs, with CP-OFDM, first RA preamble transmission (without power ramping) and second RA preamble transmission (with power ramping); and performs, with DFT-S-OFDM, third RA preamble transmission (without power ramping) and fourth preamble transmission (with power ramping).

The user apparatus 10 has a counter A for counting the number of times of power ramping with CP-OFDM, and a counter B for counting the number of times of power ramping with DFT-S-OFDM. The initial value of each counter is 0. The counter value after the first RA preamble transmission is {counter A=0; counter B=0}. After the second RA preamble transmission, the counter value is {counter A=1; counter B=0}. After the third RA preamble transmission, the counter value is {counter A=1; counter B=0}. After the fourth RA preamble transmission, the counter value is {counter A=1; counter B=1}.

As mentioned above, as a result of storing information of the number of times of power ramping for each signal waveform, the user apparatus 10 can manage power ramping for each signal waveform. For example, before performing transmission using power ramping with CP-OFDM, the user apparatus 10 can read the counter A to determine transmission power depending on the value of the counter A. Further, before performing transmission using power ramping with DFT-S-OFDM, the user apparatus 10 can read the counter B to determine transmission power depending on the value of the counter B.

Further, as described above with reference to FIG. 5, in a case where frequency multiplexing is performed for a RA preamble, the power density is reduced as a result of frequency multiplexing. Therefore, the user apparatus 10 may increase the power density by reducing the number of units of multiplexing, for example, at a time of retransmission (for example, at a time of (N+1)-th transmission and thereafter). In such a case, as described above for the example of FIG. 10, DFT-S-OFDM of a single carrier is suitable.

In this regard, in a case where the user apparatus 10 performs frequency multiplexing for a RA preamble, the user apparatus 10 may change the transmission power for the RA preamble depending on the number of units of frequency multiplexing. For example, the greater the number of units of frequency multiplexing becomes, the greater the transmission power for the RA preamble may become.

As described above, each embodiment may be combined with another embodiment. For example, in a case where the second embodiment is combined with the first embodiment, the user apparatus 10 performs operations illustrated in FIG. 10 of the second embodiment in a case where the user apparatus 10 has received a CP-OFDM designation as a signal waveform designation in step S101 of FIG. 7. However, this is an example. In a case where the user apparatus 10 has received a DFT-S-OFDM designation as a signal waveform designation in step S101 of FIG. 7, the user apparatus 10 may use DFT-S-OFDM for first through N-th transmission and use CP-OFDM for (N+1)-th transmission and thereafter.

Further, an instruction for operations according to the second embodiment may be sent to the user apparatus 10 from the base station 20. In this case, for example, in step S101 of FIG. 7, the base station 20 transmits an instruction of "CP-OFDM for first through N-th times and DFT-S-OFDM for (N+1)-th time and thereafter" to the user apparatus 10, and the user apparatus 10 performs operations of the second embodiment according to the instruction.

As a result of changing a signal waveform depending on the number of times of transmission as in the second embodiment, it is possible to increase the likelihood of success of a RA preamble, for example.

Third Embodiment

Next, a third embodiment will be described. According to the third embodiment, a resource set to be used for RA preamble transmission is previously determined for each signal waveform. In addition or instead, a preamble index set may be previously determined for each signal waveform. Information of a resource set for each signal waveform and/or information of a preamble index set for each signal waveform may be previously stored by the user apparatus 10 and the base station 20, or may be sent to the user apparatus 10 from the base station 20 with the use of broadcast information/SS, DCI, a MAC signal, or RRC signaling.

Figure 11:
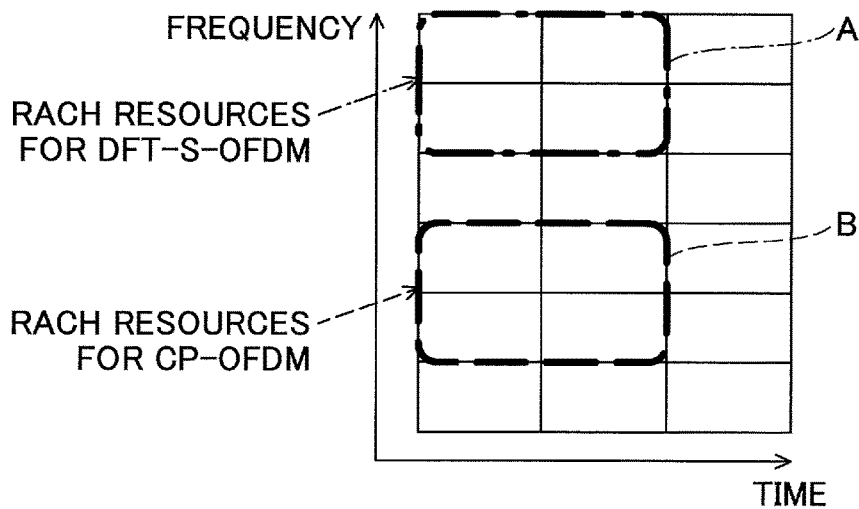
FIG. 11 illustrates an example of allocating RACH resources according to a third embodiment.

FIG. 11 illustrates an example of resources for a case where a resource set to be used for RA preamble transmission is determined for each signal waveform. In the example of FIG. 11, time-frequency resources A are allocated as a resource set for DFT-S-OFDM and time-frequency resources B are allocated as a resource set for CP-OFDM.

The user apparatus 10 transmits a RA preamble with the use of resources included in the time-frequency resources A in a case where the user apparatus 10 transmits the RA preamble with the use of DFT-S-OFDM. The user apparatus 10 transmits a RA preamble with the use of resources included in the time-frequency resources B in a case where the user apparatus 10 transmits the RA preamble with the use of CP-OFDM. As described above, time-frequency resources for DFT-S-OFDM and time-frequency resources for CP-OFDM may be designated by the base station 20 for the user apparatus 10 with the use of broadcast information/SS, DCI, a MAC signal, or RRC signaling, or may be previously stored by the user apparatus 10 and the base station 20 as configuration information.

Through the above-mentioned operations, the base station 20 can determine a signal waveform that has been used for transmitting an RA preamble with the use of resources through which the base station 20 receives the RA preamble, and can perform signal detection operation depending on the signal waveform. Note that, in a case where the base station 20 identifies a signal waveform that is used by the user apparatus 10 such as a case where the base station 20 designates the signal waveform for the user apparatus 10, the base station 20 may omit determining a signal waveform on the basis of resources.

There are the following pattern No. 1, pattern No. 2, and pattern No. 3, for example, of the above-described relationships between RACH resource subsets associated with BS transmission beams and FIG. 11:

<Pattern No. 1>

Figure 12:
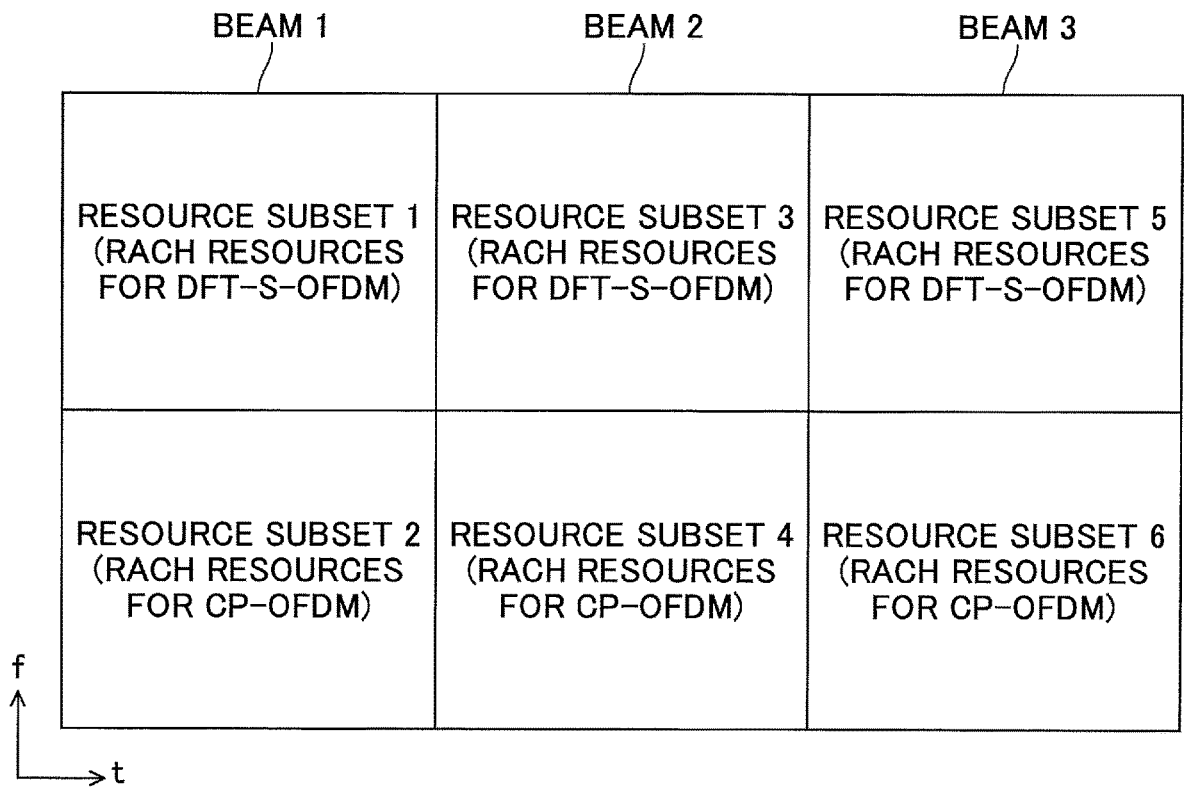
FIG. 12 illustrates an example of allocating RACH resources according to the third embodiment.

Allocation of resources illustrated in FIG. 11 illustrates allocation within a single RACH resource subset. In this case, for example, such a resource allocation as that illustrated in FIG. 12 may be performed. In the example illustrated in FIG. 12, as RACH resource subsets corresponding to a BS transmission beam 1, "resource subset 1+resource subset 2" exist. The resource subset 1 is allocated as resources for DFT-S-OFDM, and the resource subset 2 is allocated as resources for CP-OFDM. Also concerning BS transmission beams 2 and 3, resources are allocated in the same way.

<Pattern No. 2>

It is also possible to associate a signal waveform with a RACH resource subset that is associated with a BS transmission beam. For example, for a case where RACH resource subsets A, B, and C are associated with BS transmission beams A, B, and C, correspondence relationships such as {RACH resource subset A, signal waveform 1}, {RACH resource subset B, signal waveform 1}, and {RACH resource subset C, signal waveform 2} are previously determined. In the example of FIG. 11, for example, resources A are a RACH resource subset associated with a BS transmission beam A, and resources B are a RACH resource subset associated with a BS transmission beam B. Information of these correspondence relationships may be previously stored in the user apparatus 10 and the base station 20, or may be sent to the user apparatus 10 from to the base station 20.

Then, for example, the user apparatus 10 uses the signal waveform 1 for transmitting a RA preamble through the RACH resource subset A and uses the signal waveform 2 for transmitting a RA preamble through the RACH resource subset C.

<Pattern No. 3>

The pattern No. 1 may be combined with the pattern No. 2. That is, each RACH resource subset is classified into a plurality of resources, and the respective resources are associated with signal waveforms. For example, for a case where BS transmission beams A, B, and C are associated with RACH resource subsets A, B, and C, a correspondence relationship {RACH resource subset A, resource 1:signal waveform 1 and resource 2:signal waveform 2} is determined in a case where the RACH resource subset A is classified into the resource 1 and the resource 2. Also the RACH resource subsets B and C are classified into resources and are associated with signal waveforms in the same way. In this case, a manner of classifying resources and a manner of associating them with signal waveforms may be different between RACH resource subsets.

Thus, the patterns Nos. 1, 2, and 3 have been described.

For a case where preamble index sets are determined for respective signal waveforms, 32 preamble indexes 0-31 are allocated for DFT-S-OFDM and 32 preamble indexes 32-63 are allocated for CP-OFDM, for example, in a case where there are 64 preamble indexes 0-63 (numbers identifying preambles) in total.

For transmitting a RA preamble with the use of DFT-S-OFDM, the user apparatus 10 selects one preamble from among the 32 preambles having the indexes 0-31, and transmits the preamble with the use of DFT-S-OFDM.

For transmitting a RA preamble with the use of CP-OFDM, the user apparatus 10 selects one preamble from among the 32 preambles having the indexes 32-63, and transmits the preamble with the use of CP-OFDM.

As a result of, as in the third embodiment, the user apparatus 10 selecting RA preamble transmission resources and/or a RA preamble index depending on a signal waveform to use, the base station 20 can determine the signal waveform that has been used by the user apparatus 10 on the basis of the RA preamble transmission resources and/or the RA preamble index, for example.

Fourth Embodiment

Next, a fourth embodiment will be described. The fourth embodiment relates to a signal waveform of data that is transmitted by the user apparatus 10 with the use of a PUSCH (Physical Uplink Shared Channel) subsequent to a RA preamble in a random access procedure. The data is a message 3 (Msg3) in a case of contention based random access. The data is any data in a case of contention free random access.

For example, the user apparatus 10 uses a signal waveform used to transmit a RA preamble as a signal waveform to use to transmit the above-mentioned data. The "signal waveform used to transmit a RA preamble" is, for example, a signal waveform used for first RA preamble transmission. Alternatively, the "signal waveform used to transmit a RA preamble" may be a signal waveform used when RA preamble transmission is successful. In the latter case, in a case where, for example, first transmission of a RA preamble with the use of CP-OFDM fails but transmission of a RA preamble with the use of DFT-S-OFDM in retransmission is successful, the user apparatus 10 transmits the data with the use of DFT-S-OFDM.

Alternatively, the user apparatus 10 may determine a signal waveform to use to transmit the above-mentioned data on the basis of a value of Timing Advance that is sent in a RAR. A value of Timing Advance is a value to be used for adjusting timing of Uplink transmission from the user apparatus 10, and may be called transmission timing information. Normally, as the propagation delay between the base station 20 and the user apparatus 10 becomes greater (that is, as the distance between the base station 20 and the user apparatus 10 becomes greater), the value that is sent as a value of Timing Advance becomes greater accordingly.

For example, in a case where a value of Timing Advance is less than or equal to a predetermined value X, the user apparatus 10 uses CP-OFDM to transmit the data, and, in a case where a value of Timing Advance is greater than the predetermined value X, the user apparatus 10 uses DFT-S-OFDM to transmit the data. However, this is one example.

The above-mentioned X may be previously stored by the user apparatus 10 and the base station 20 as a value determined in the specification of the like, or may be designated by the base station 20 for the user apparatus 10 with the use of broadcast information/SS, DCI, a MAC signal, or RRC signaling. It is also possible that the value X is sent in a RAR that includes a value of Timing Advance.

Figure 13:
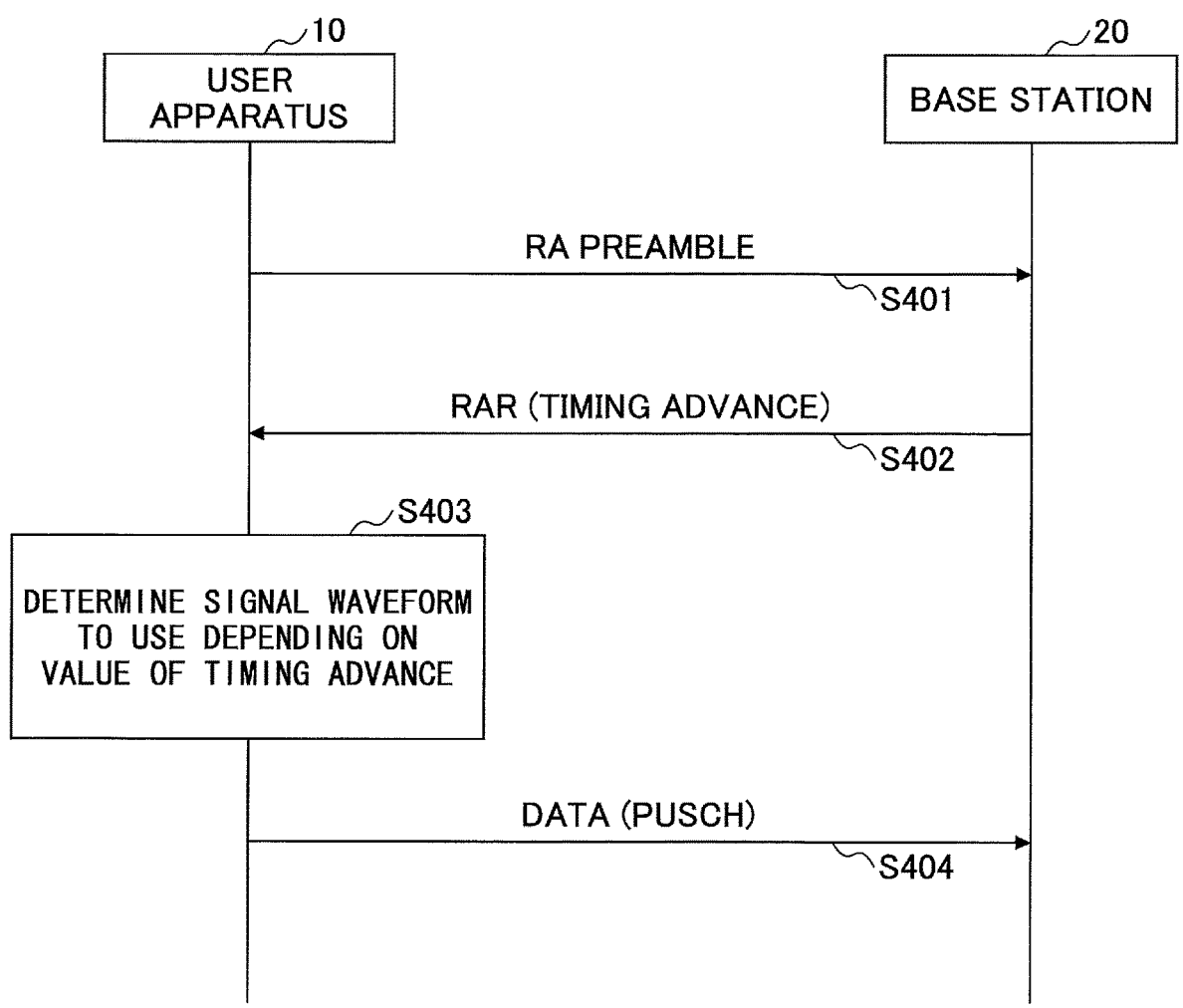
FIG. 13 illustrates an example of operations according to a fourth embodiment.

FIG. 13 is a sequence diagram for a case of determining a signal waveform to use for data transmission on the basis of the value of Timing Advance.

In step S401, the user apparatus 10 transmits a RA preamble. In step S402, the user apparatus 10 receives a RAR that includes a value of Timing Advance from the base station 20. The RAR also includes information of resources to be allocated for data transmission through PUSCH.

In step S403, the user apparatus 10 determines a signal waveform to use to transmit the data on the basis of a value of Timing Advance. In step S404, the user apparatus 10 transmits the data with the use of the signal waveform determined in step S403.

It is also possible that the base station 20 determines a signal waveform on the basis of a value of Timing Advance, and sends information of the determined signal waveform to the user apparatus 10.

In this case, the base station 20 calculates a value of Timing Advance on the basis of timing of receiving an Uplink signal (for example, a RA preamble) from the user apparatus 10. Then, in the same way as the above-mentioned determination method in the user apparatus 10, the base station 20 determines to cause the user apparatus 10 to use CP-OFDM in a case where the value of Timing Advance is less than or equal to the predetermined value X, and determines to cause the user apparatus 10 to use DFT-S-OFDM in a case where the value of Timing Advance is greater than the predetermined value X. However, this is one example. Then, the base station 20 sends information of the determined signal waveform to the user apparatus 10. A signal to be used for sending the information is, for example, a RAR. However the signal is not limited thereto. It is also possible that the base station 20 sends information of the signal waveform to the user apparatus 10 with the use of broadcast information/SS, DCI, a MAC signal, or RRC signaling.

As a result of a signal waveform for data transmission being determined on the basis of a value of Timing Advance as in the fourth embodiment, the user apparatus 10 can perform data transmission with the use of a suitable signal waveform. Note that, the method of determining a signal waveform on the basis of a value of Timing Advance described for the fourth embodiment can be used also in a random access procedure in which designation of a signal waveform for RA preamble transmission is not performed.

(Apparatus Configuration)

Next, an example of a function configuration of the user apparatus 10 and the base station 20 that perform the above-described processing operations will be described. Each of the user apparatus 10 and the base station 20 includes at least functions for implementing the first through fourth embodiments. However, each of the user apparatus 10 and the base station 20 may include only some functions of the first through fourth embodiments.

<User Apparatus>

Figure 14:
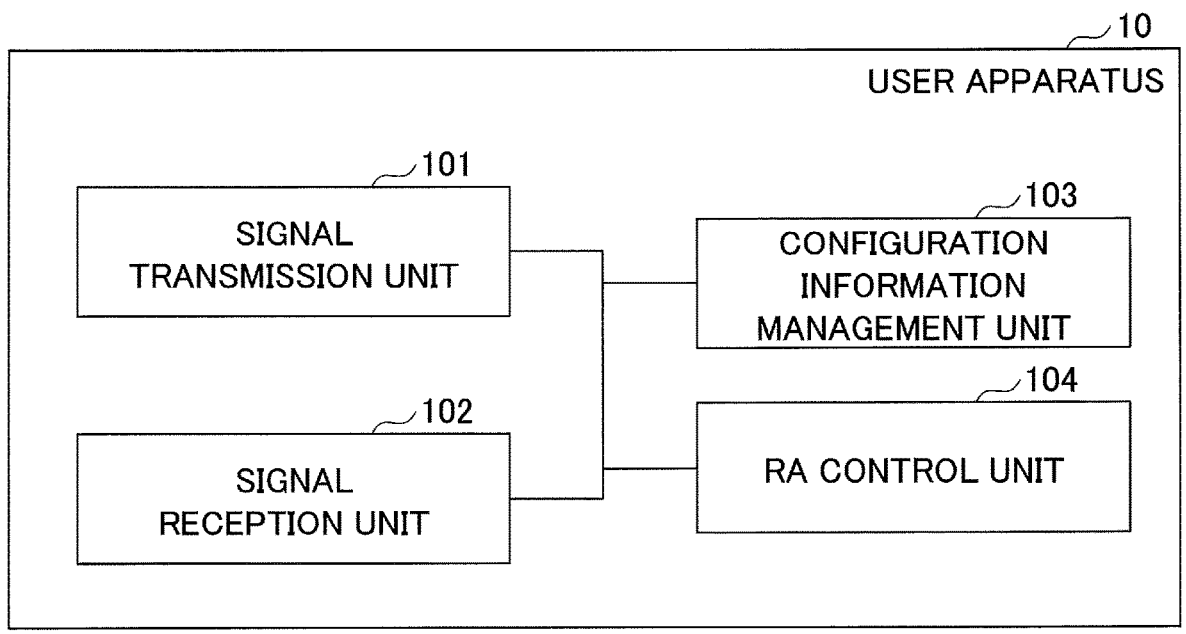
FIG. 14 illustrates an example of a function configuration of the user apparatus 10.

FIG. 14 illustrates one example of a function configuration of the user apparatus 10. As illustrated in FIG. 14, the user apparatus 10 includes a signal transmission unit 101, a signal reception unit 102, a configuration information management unit 103, and a RA control unit 104. The function configuration illustrated in FIG. 14 is merely one example. Function classifications and names of function units thereof can be any classifications and names as long as operations according to the present carrying-out mode can be implemented.

The signal transmission unit 101 creates a transmission signal from transmission data, and transmits the transmission signal wirelessly. The signal reception unit 102 receives various signals wirelessly, and acquires signals of higher layers from the received signals of physical layers.

The configuration information management unit 103 stores various configuration information received from the base station 20 via the signal reception unit 102. Further, the configuration information management unit 103 stores also configuration information that is previously set. The contents of the configuration information are, for example, information of a signal waveform to be used, a value of N in the second embodiment, information of correspondence between a signal waveform and resources, information of correspondence between a signal waveform and a preamble index, other parameters, and so forth.

The RA control unit 104 performs control of a random access procedure in the user apparatus 10 described above for the basic example and the first through fourth embodiments. In this regard, it is possible to include, in the signal transmission unit 101, a function unit concerning signal transmission included in the RA control unit 104, and include, in the signal reception unit 102, a function unit concerning signal reception included in the RA control unit 104.

Further, for example, the signal reception unit 102 may be configured to receive, from the base station 20, information that designates a signal waveform to be used by the user apparatus 10 to transmit a random access preamble. Also, the signal transmission unit 101 may be configured to transmit a random access preamble with the use of the signal waveform designated by the information received by the signal reception unit 102. Further, the signal transmission unit 101 may be configured to, in a case of performing random access preamble transmission for a plurality of times that include first transmission and retransmission, perform random access preamble transmission from a first transmission through a predetermined number-th transmission with the use of a first signal waveform and perform random access preamble transmission following the predetermined number-th transmission and thereafter with the use of a second signal waveform.

Further, the signal transmission unit 101 may be configured to transmit a random access preamble with the use of resources corresponding to a signal waveform to use. Further, the signal transmission unit 101 may transmit a random access preamble having an index corresponding to a signal waveform to use. Further, the signal reception unit 102 may receive a random access response including transmission timing information, and the signal transmission unit 101 may determine a signal waveform to use for data transmission on the basis of the transmission timing information.

<Base Station 20>

Figure 15:
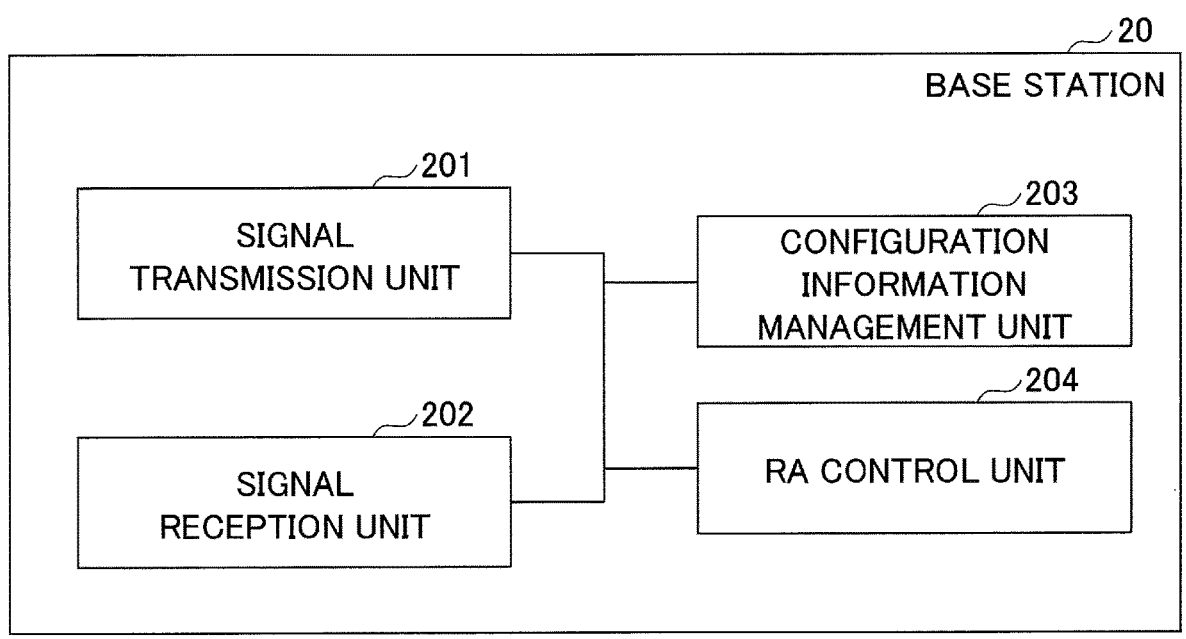
FIG. 15 illustrates one example of a function configuration of the base station 20.

FIG. 15 illustrates one example of a function configuration of the base station 20. As illustrated in FIG. 15, the base station 20 includes a signal transmission unit 201, a signal reception unit 202, a configuration information management unit 203, and a RA control unit 204. The function configuration illustrated in FIG. 15 is merely one example. Function classifications and names of function units thereof can be any classifications and names as long as operations according to the present carrying-out mode can be implemented.

The signal transmission unit 201 includes functions of generating a signal to transmit to the user apparatus 10 and transmitting the signal wirelessly. The signal reception unit 202 includes functions of receiving various types of signals transmitted from the user apparatus 10 and acquiring, for example, information of a higher layer from the received signals.

The configuration information management unit 203 stores configuration information that is previously set and various configuration information to be transmitted to the user apparatus 10. The contents of the configuration information are, for example, information of signal waveforms to be used by the respective user apparatuses, a value of N in the second embodiment, information of correspondences between signal waveforms and resources, information of correspondences between signal waveforms and preamble indexes, other parameters, and so forth.

The RA control unit 204 performs control of a random access procedure in the base station 20 described above for the basic example and the first through fourth embodiments. In this regard, it is possible to include, in the signal transmission unit 201, a function unit concerning signal transmission included in the RA control unit 204, and include, in the signal reception unit 202, a function unit concerning signal reception included in the RA control unit 204.

<Hardware Configuration>

The block diagrams used in the description for the above-mentioned embodiments (FIGS. 14 and 15) illustrate blocks in function units. These function blocks (configuration units) are implemented by an arbitrary combination of hardware and/or software. In this regard, means for implementing the respective function blocks are not limited. That is, each function block may be implemented by one unit that is a physical and/or logical combination of a plurality of elements. Alternatively, each function block may be implemented by two or more devices that are physically and/or logically separated and directly and/or indirectly (for example, in a wired and/or wireless manner) connected together.

Figure 16:
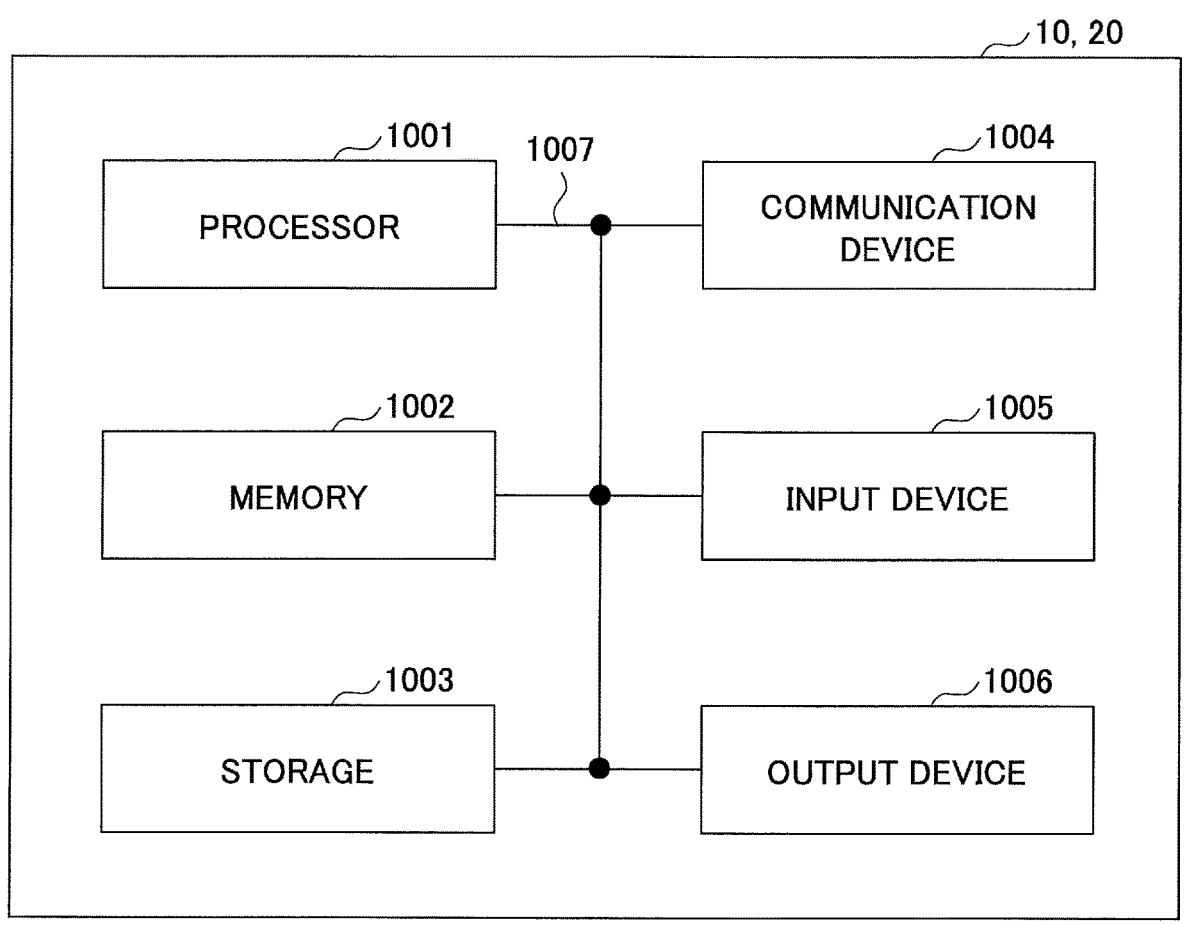
FIG. 16 illustrates one example of a hardware configuration of the user apparatus 10 and the base station 20.

Further, for example, each of the user apparatus 10 and the base station 20 according to the mode for carrying out the present invention may function as a computer that performs the processing according to the present carrying-out mode. FIG. 16 illustrates one example of a hardware configuration of the user apparatus 10 and the base station 20 according to the present carrying-out mode. Each of the above-described user apparatus 10 and base station 20 may be configured as a computer apparatus that physically includes a processor 1001, a memory 1002, a storage 1003, a communication device 1004, an input device 1005, an output device 1006, a bus 1007, and so forth.

Note that, below, the term "device" may be read as a circuit, a unit, or the like. The hardware configuration of the user apparatus 10 and the base station 20 may be configured to include one or more of the devices 1001-1006 illustrated, or may be configured not to include some of the devices 1001-1006 illustrated.

Each function in the user apparatus 10 and the base station 20 is implemented as a result of hardware such as the processor 1001 and the memory 1002 reading predetermined software (program), and thereby the processor 1001 performing operations to control communication by the communication device 1004 and control reading data from and/or writing data to the memory 1002 and the storage 1003.

The processor 1001 controls the entirety of the computer by causing an operating system to operate, for example. The processor 1001 may include a central processing unit (CPU) that includes an interface for a peripheral device, a control device, an arithmetic device, a register, and so forth.

Further, the processor 1001 reads a program (program code), a software module, or data from the storage 1003 and/or the communication device 1004 onto the memory 1002, and thus implements various processes according to the read information. As the program, a program that causes the computer to perform at least some of the operations described above for the above-mentioned carrying-out mode is used. For example, the signal transmission unit 101, the signal reception unit 102, the configuration information management unit 103, and the RA control unit 104 of the user apparatus 10 illustrated in FIG. 14 may be implemented by a control program that is stored in the memory 1002 and operates with the processor 1001. Further, for example, the signal transmission unit 201, the signal reception unit 202, the configuration information management unit 203, and the RA control unit 204 of the base station 20 illustrated in FIG. 15 may be implemented by a control program that is stored in the memory 1002 and operates with the processor 1001. In this regard, it has been described that the various processes described above are implemented by the single processor 1001. However, the various processes may be implemented by two or more processors 1001 simultaneously or sequentially. The processor 1001 may include one or more chips. The programs may be transmitted from a network through an electric communication line.

The memory 1002 is a computer readable recording medium, and includes, for example, at least one of a ROM (Read-Only Memory), an EPROM (Erasable Programmable ROM), an EEPROM (Electrically Erasable Programmable ROM), a RAM (Random Access Memory), and so forth. The memory 1002 may be called a register, a cache, a main memory (main storage), or the like. The memory 1002 can store the program, the software module, or the like executable for implementing the processing according to the mode for carrying out the present invention.

The storage 1003 is a computer readable recording medium and includes, for example, at least one of an optical disc such as a CD-ROM (Compact Disc ROM), a hard disk drive, a flexible disk, a magneto-optical disc (for example, a compact disc, a digital versatile disc, a Blu-ray (registered trademark) disc), a smart card, a flash memory (for example, a card, a stick, or a key drive), a floppy (registered trademark) disk, a magnetic strip, and so forth. The storage 1003 may be called an auxiliary storage device. The above-described recording medium may be, for example, a suitable medium such as a database, a server, or the like that includes the memory 1002 and/or storage 1003.

The communication device 1004 is hardware (a transmission and reception device) for performing communication between computers through a wired and/or wireless network and may also be called, for example, a network device, a network controller, a network card, a communication module, or the like. For example, the signal transmission unit 101 and the signal reception unit 102 of the user apparatus 10 may be implemented by the communication device 1004. Further, the signal transmission unit 201 and the signal reception unit 202 of the base station 20 may be implemented by the communication device 1004.

The input device 1005 is an input device (for example, a keyboard, a mouse, a microphone, a switch, a button, a sensor, or the like) that receives an input from the outside. The output device 1006 is an output device (for example, a display, a speaker, a LED light, or the like) that outputs information to the outside. The input device 1005 and the output device 1006 may be configured as one unit (for example, a touch panel).

Further, the respective devices such as the processor 1001 and the memory 1002 are connected together via a bus 1007 for sending and receiving information therebetween. The bus 1007 may include a single bus or may include respective different buses depending on the corresponding devices.

Further, each of the user apparatus 10 and the base station 20 may include hardware such as a microprocessor, a digital signal processor (DSP), an ASIC (Application Specific Integrated Circuit), a PLD (Programmable Logic Device), or a FPGA (Field Programmable Gate Array). The hardware may implement some or all of the respective function blocks. For example, the processor 1001 may be implemented by at least one of these hardware units.

(Summary of Carrying-Out Mode)

As described above, according to the mode for carrying out the present invention, a user apparatus in a radio communication system that includes a base station and the user apparatus is provided. The user apparatus includes a reception unit that receives, from the base station, information that designates a signal waveform to be used by the user apparatus for transmitting a random access preamble; and a transmission unit that transmits a random access preamble with the use of the signal waveform designated by the information received by the reception unit.

The above-mentioned configuration enables, in the radio communication system that includes the user apparatus and the base station, the user apparatus to perform a random access procedure with the use of a suitable signal waveform.

In a case where the transmission unit performs random access preamble transmission for a plurality of times including first transmission and retransmission, the transmission unit may perform random access preamble transmission from a first transmission through a predetermined number-th transmission with the use of a first signal waveform and the transmission unit may perform random access preamble transmission following the predetermined number-th transmission and thereafter with the use of a second signal waveform. This configuration can, for example, increase a likelihood that the random access preamble transmission is successful.

In a case where resources to be used for random access preamble transmission are determined for each signal waveform, the transmission unit may transmit a random access preamble with the use of resources corresponding to a signal waveform to use. In a case where an index of a random access preamble is previously determined for each signal waveform, the transmission unit may transmit a random access preamble having an index corresponding to a signal waveform to use. Thanks to these configurations, the base station can determine the signal waveform that has been used by the user apparatus for random access preamble transmission on the basis of the resources through which the random access preamble has been received and/or the index of the random access preamble, for example.

The reception unit may receive a random access response that includes transmission timing information, and the transmission unit may determine a signal waveform to use for data transmission on the basis of the transmission timing information. Thanks to these configurations, the user apparatus can perform data transmission with the use of a suitable signal waveform.

Further, according to the mode for carrying out the present invention, a user apparatus in a radio communication system that includes a base station and the user apparatus is provided. The user apparatus includes a transmission unit that transmits a random access preamble. In a case where the transmission unit performs random access preamble transmission for a plurality of times that includes first transmission and retransmission, the transmission unit performs random access preamble transmission from a first transmission through a predetermined number-th transmission with the use of a first signal waveform and the transmission unit performs random access preamble transmission following the predetermined number-th transmission and thereafter with the use of a second signal waveform. Thanks to these configurations, in a radio communication system that includes a user apparatus and a base station, the user apparatus can perform a random access procedure with the use of a suitable signal waveform.

Further, according to the mode for carrying out the present invention, a user apparatus in a radio communication system that includes a base station and the user apparatus is provided. The user apparatus includes a transmission unit that transmits a random access preamble to the base station; and a reception unit that receives a random access response that includes transmission timing information from the base station. The transmission unit determines a signal waveform to use for data transmission on the basis of the transmission timing information. Thanks to these configurations, in a radio communication system that includes a user apparatus and a base station, the user apparatus can perform a random access procedure with the use of a suitable signal waveform.

(Supplement to Carrying-Out Mode)

Thus, the mode for carrying out the present invention has been described. However, the disclosed invention is not limited to such a mode for carrying out the present invention, and the person skilled in the art will understand various variants, modified examples, replacement examples, and so forth. Although specific numerical values have been used as examples for promoting understanding of the invention, the numerical values are merely examples unless otherwise noted, and any other suitable values may be used instead. The classifications of items in the above description are not essential to the present invention, matters described in two or more items may be used in combination if necessary, and a matter described in an item may be used as a matter described in another item (unless a contradiction arises). Boundaries between function units or processing units are not necessarily boundaries of physical components. Operations of a plurality of function units may be physically implemented by a single component, and an operation of a single function unit may be physically implemented by a plurality of components. Concerning processing procedures according to the mode for carrying out the present invention, the order of processing steps may be changed unless a contradiction arises. For the sake of convenience for describing processing, the user apparatus 10 and the base station 20 have been described with the use of the functional block diagrams. However, these apparatuses may be implemented with hardware, software, or a combination thereof. Each of the software that is executed by the processor of the user apparatus 10 according to the mode for carrying out the present invention and the software that is executed by the processor of the base station 20 according to the mode for carrying out the present invention may be stored in any suitable recording medium such as a random access memory (RAM), a flash memory, a read-only memory (ROM), an EPROM, an EEPROM, a register, a hard disk (HDD), a removable disk, a CD-ROM, a database, or a server.

Further, sending of information may be implemented not only according to the mode for carrying out the present invention herein but also by another method. For example, sending of information may be implemented with the use of physical layer signaling (for example, DCI (Downlink Control Information) or UCI (Uplink Control Information)), upper layer signaling (for example, RRC (Radio Resource Control) signaling, MAC (Medium Access Control) signaling, broadcast information (a MIB (Master Information Block), or a SIB (System Information Block)), or other signal, or a combination thereof. Further, RRC signaling may be called a RRC message, and, for example, may be a RRC Connection Setup message, a RRC Connection Reconfiguration message, or the like.

Each mode for carrying out the present invention described herein may be used in a system that uses a suitable system such as LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), or Bluetooth (registered trademark), and/or a next-generation system expanded on the basis thereof.

Concerning the processing procedures, sequences, flowcharts, and so forth according to each mode for carrying out the present invention described herein, the orders of processing steps may be changed unless a contradiction arises. For example, concerning the methods described herein, various step elements are illustrated in example orders, and orders thereof are not limited to the illustrated specific orders.

Specific operations performed by the base station 20 described herein may in some cases be performed by an upper node. It is clear that various operations performed for communication with the user apparatus 20 can be performed by the base station 20 and/or another network node (for example, a MME, a S-GW or the like may be cited, but not limited thereto) in a network that includes one or more network nodes including the base station 20. Thus, the above-mentioned network node other than the base station 20 is a single node for example. However, the above-mentioned network node other than the base station 20 may be a combination of a plurality of other network nodes (for example, a MME and a S-GW).

Each mode for carrying out the present invention described herein may be solely used, may be used in combination with another carrying-out mode, or may be used in a manner of being switched with another carrying-out mode at a time of being performed.

By the person skilled in the art, the user apparatus 10 may be called any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

By the person skilled in the art, the base station 20 may be called any one of a NB (NodeB), an eNB (enhanced NodeB), a gNB, and other suitable terms.

The term "to determine" used herein may mean various operations. For example, "to determine" may mean to consider having determined to have performed judging, calculating, computing, processing, deriving, investigating, looking up (for example, looking up a table, a database, or another data structure), or ascertaining, or the like. Also, "to determine" may mean to consider having determined to have performed receiving (for example, receiving information), transmitting (for example, transmitting information), inputting, outputting, or accessing (for example, accessing data in a memory), or the like. Also, "to determine" may mean to consider having determined to have performed resolving, selecting, choosing, establishing, comparing, or the like. That is, "to determine" may mean to consider having determined a certain operation.

Words "based on" or "on the basis of" used herein do not mean "based on only" or "on the basis of only" unless otherwise specified. That is, the words "based on" or "on the basis of" mean both "based on only" and "based on at least" or both "on the basis of only" and "on the basis of at least".

As long as any one of "include", "including", and variations thereof is used herein or the claims, this term has an intended meaning of inclusiveness in the same way as the term "comprising". Further, the term "or" used herein or the claims has an intended meaning of not exclusive-or.

Throughout the present disclosure, in a case where an article such as a, an, or the in English is added through a translation, the article may be of a plural form unless the context clearly indicates otherwise.

Thus, the present invention has been described in detail. In this regard, it is clear that the person skilled in the art understands that the present invention is not limited to the mode for carrying out the present invention described herein. The present invention can be implemented in a modified or changed mode without departing from the effect and the scope of the present invention. Therefore, the description herein is for the illustrative purpose and does not have any restrictive meaning.

DESCRIPTION OF REFERENCE SIGNS 10 user apparatus
101 signal transmission unit
102 signal reception unit
103 configuration information management unit
104 RA control unit
20 base station
201 signal transmission unit
202 signal reception unit
203 configuration information management unit
204 RA control unit
1001 processor
1002 memory
1003 storage
1004 communication device
1005 input device
1006 output device

The invention claimed is:

1. A terminal in a radio communication system that includes a base station and the terminal, the terminal comprising:
a receiver that receives, from the base station, information that designates a signal waveform to be used by the terminal to transmit a random access preamble; and
a transmitter that transmits the random access preamble with the use of the signal waveform designated by the information received by the receiver, wherein
the receiver receives a random access response that includes transmission timing information, and
the transmitter determines the signal waveform to use for data transmission on the basis of the transmission timing information.

2. The terminal as claimed in claim 1, wherein
in a case where the transmitter performs random access preamble transmission for a plurality of times that includes first transmission and retransmission, the transmitter performs random access preamble transmission from a first transmission through a predetermined number-th transmission with the use of a first signal waveform and the transmitter performs random access preamble transmission following the predetermined number-th transmission and thereafter with the use of a second signal waveform.

3. The terminal as claimed in claim 2, wherein
resources to be used for random access preamble transmission are determined for each signal waveform, and the transmitter transmits a random access preamble with the use of resources corresponding to a signal waveform to use.

4. The terminal as claimed in claim 2, wherein
an index of a random access preamble is determined for each signal waveform, and the transmitter transmits a random access preamble having an index corresponding to a signal waveform to use.

5. The terminal as claimed in claim 1, wherein
resources to be used for random access preamble transmission are determined for each signal waveform, and the transmitter transmits a random access preamble with the use of resources corresponding to a signal waveform to use.

6. The terminal as claimed in claim 5, wherein
an index of a random access preamble is determined for each signal waveform, and the transmitter transmits a random access preamble having an index corresponding to a signal waveform to use.

7. The terminal as claimed in claim 1, wherein
an index of a random access preamble is determined for each signal waveform, and the transmitter transmits a random access preamble having an index corresponding to a signal waveform to use.

8. A random access preamble transmission method performed by a terminal in a radio communication system that includes a base station and the terminal, the random access preamble transmission method comprising:
receiving, from the base station, information that designates a signal waveform to be used by the terminal to transmit a random access preamble;
transmitting the random access preamble with the use of the signal waveform designated by the information received in the receiving;
receiving a random access response that includes transmission timing information; and
determining the signal waveform to use for data transmission on the basis of the transmission timing information.

* * * * *